United States Patent Office 3,533,838
Patented Oct. 13, 1970

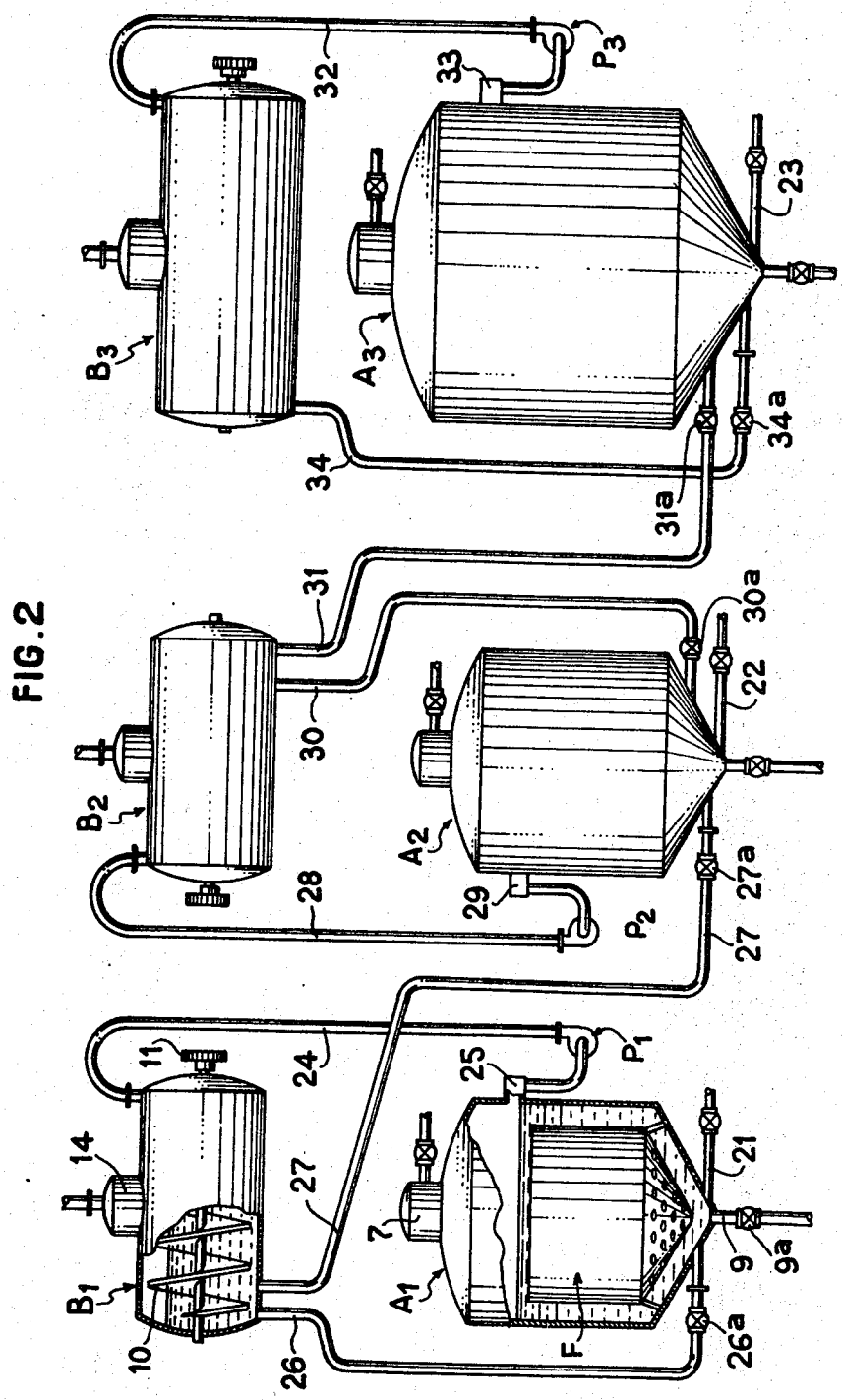

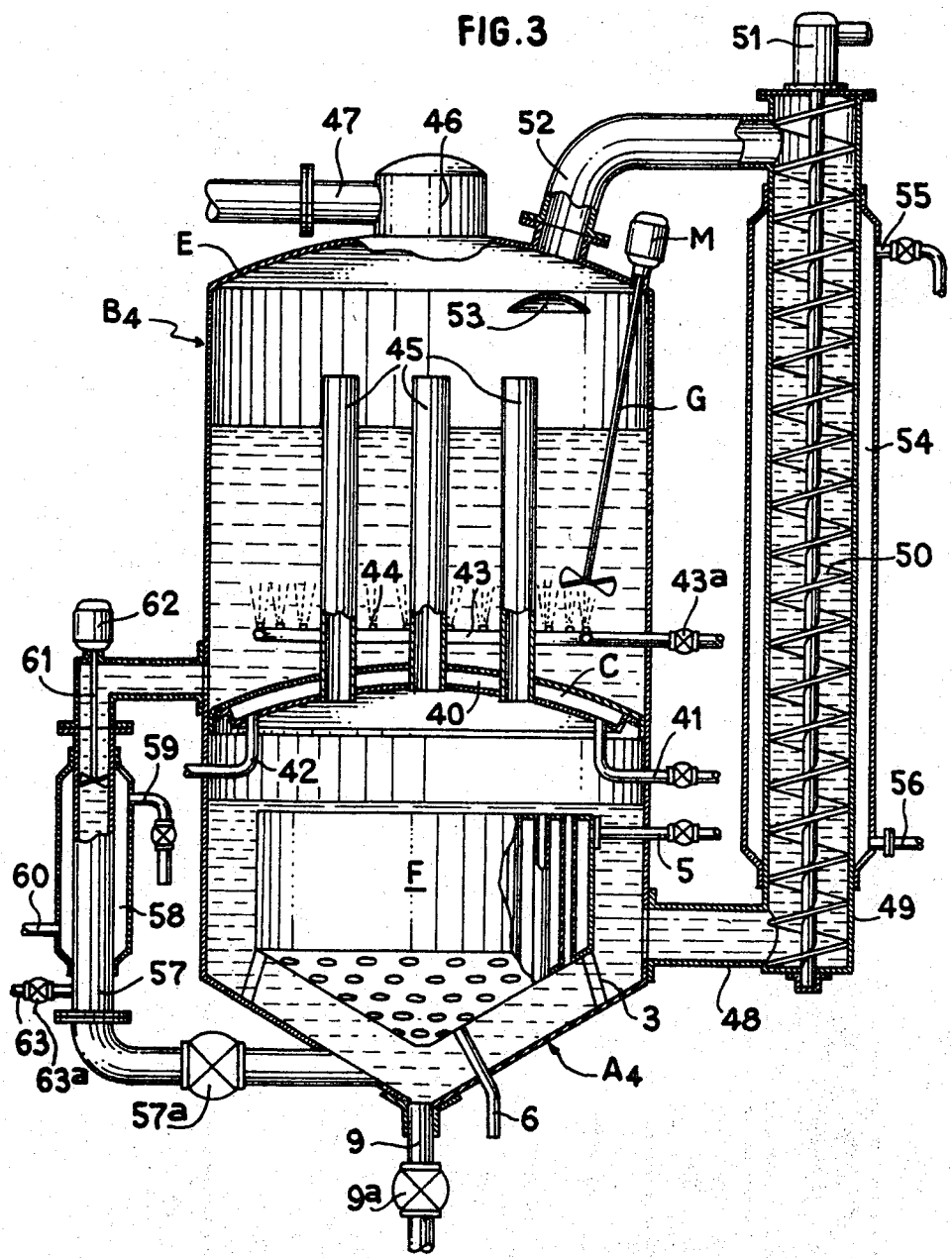

3,533,838
METHOD AND INSTALLATION FOR CRYSTALLIZATION OF SUGAR
Robert Gazagne, Paris, France, assignor to S.I.C.E.R.—Societe Industrielle et Commerciale d'Etudes et de Realisations, Alfortville, France, a French body corporate
Filed Sept. 13, 1967, Ser. No. 667,601
Claims priority, application France, Sept. 16, 1966, 76,668
Int. Cl. B01d 9/00; C13f 1/02; C13k 1/10
U.S. Cl. 127—16     11 Claims

ABSTRACT OF THE DISCLOSURE

A method and installation for the crystallization of sugar by evaporation of sugared liquids in sugar factories and refineries, in which a portion of the sugared mass is withdrawn from the cooking device containing it, is kept in reserve and at least a part of the said portion is returned to the cooking device which also receives fresh sugared liquid to be evaporated, the rates of withdrawal and of return of the said portion being regulated in such a way as to keep approximately constant the level of liquid in the cooking device.

---

The present invention relates to an improved method and installation for the crystallization of sugar in the sugar factory or refinery and more particularly to a method and installation for improving crystallization of sugar in sugar factories and refineries by means of evaporation.

In standard cookinng apparatus in which the evaporation of the sugared juice or liquid takes place for its crystallization, fresh sugared liquid to be evaporated to crystallize the sugar it contains is added to a certain amount of concentrated juice, forming what is called the "cooking base," almost continuously for the duration of the evaporation stage. As the rate of admission of the sugared liquid is normally greater than the rate of elimination of water by evaporation, the level of the liquid in the interior of the cooking apparatus gradually rises above the clearing zone of the heating surface of the heating set installed in the cooking apparatus. The result that there is less and less satisfactory evaporation in proportion to the rising of the level, a lack of homogeneity of the mass circulating less satisfactorily in the tubes of the heating set, the risk of local overheating because of this bad circulation, and a poor crystallization yield and a very long evaporation stage result.

It is the aim of the present invention to overcome the above-mentioned disadvantages.

The invention has for purpose a method for improving the crystallization of sugar by evaporation of sugared liquids in cooking devices of sugar factories and refineries, wherein, a portion of the sugared mass is withdrawn from the cooking device containing it, is kept in reserve and at least a part of the said portion is returned to the cooking device which also receives fresh sugared liquid to be evaporated, the rates of withdrawal and of return of the said portion being regulated in such a way as to keep approximately constant the level of liquid in the cooking device.

By "approximately constant level" is intended to mean, in the present description and claims, a level of liquid kept within predetermined limits that are close to each other.

The invention also aims at providing an installation for evaporation or cooking for putting in operation the method defined above, having at least one cooking apparatus or evaporator, the said installation having the feature that it comprises a storage tank, a first conduit means connecting the cooking apparatus to the said tank, a second conduit means connecting the tank to one of the said cooking apparatuses and means for regulating the rate of circulation of the sugared mass through the conduit means and the said tank.

By virtue of the method and installation of the invention, it is possible in particular:

(a) at any desired moment of the evaporation stage to keep the level of the cooked mass only slightly clear of or above the heating surface, which makes it possible to obtain practically constant evaporation and considerable reduction in the duration of the evaporation stage.

(b) to remove continuously or intermittently the excess volume of cooked mass in the cooking apparatus and to store it in a storage tank in which can be created a vacuum or pressures, as desired.

(c) to ensure regulatable recycling of the cooked mass between the storage tank and the cooking apparatus in such a way as to keep the cooked mass totally homogeneous in the course of the cooking.

Other characteristics and advantages of the invention will be seen from the following description.

In the attached drawings, given purely by way of example:

FIG. 2 is a diagrammatic view of another embodiment of the installation of the invention, the cooking device of which comprises several cooking apparatuses;

FIG. 3 is a view analogous to FIG. 1 of another embodiment of the installation of the invention.

Figure 1:
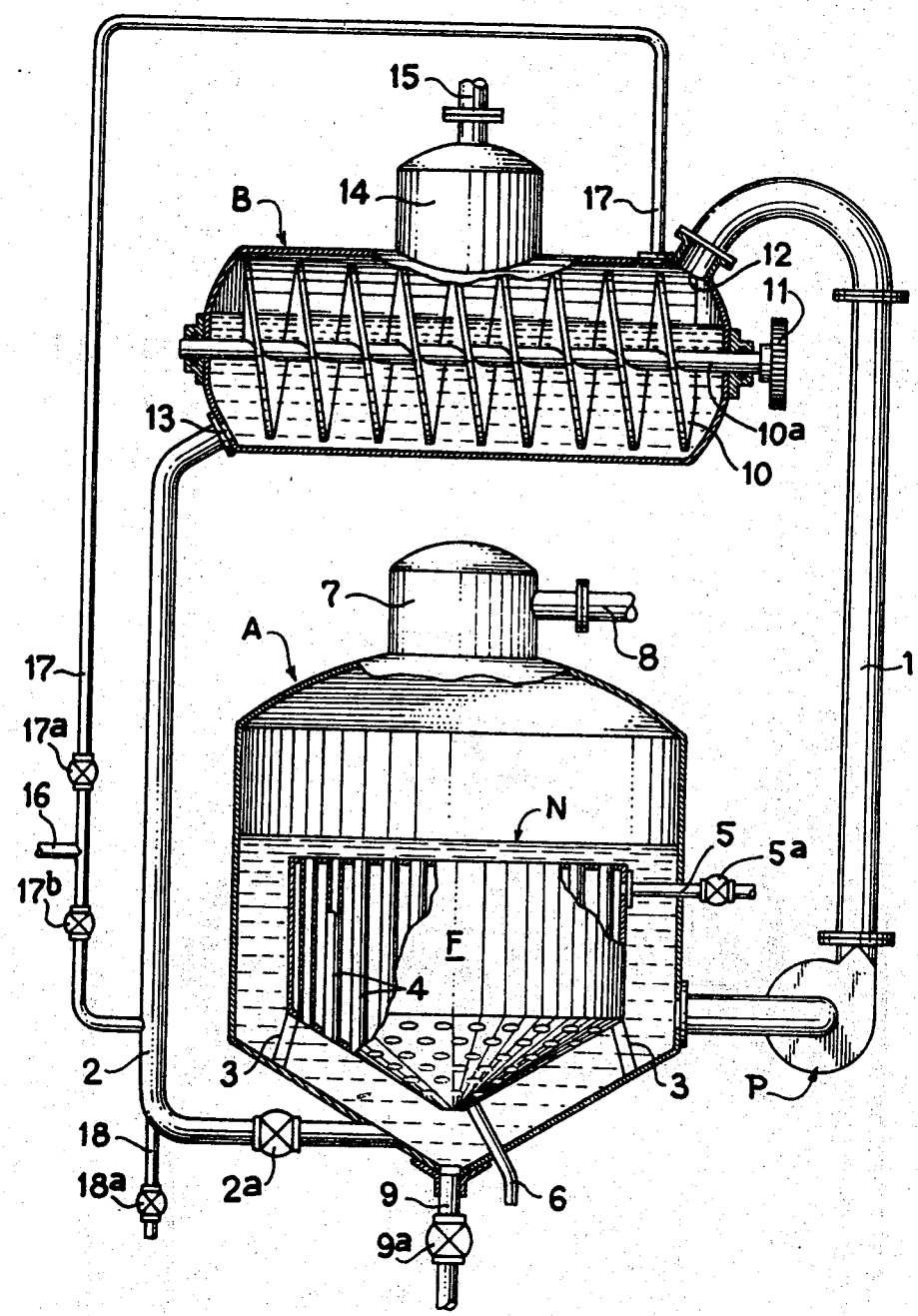
FIG. 1 is a perspective view with cut away portions of an embodiment of the installation of the invention.

The installation illustrated in FIG. 1 comprises a cooking apparatus or vertical evaporator A of standard type having an inner chamber for receiving the sugared liquid, a storage tank B and conduits or conduit means 1 and 2 connecting respectively the cooking apparatus A to the tank B and vice versa.

In the interior of the cooking apparatus, that is in the inner chamber, there is installed by means of supports 3 a heating nest of tubes or set F comprising a plurality of vertical tubes 4 for the circulation of the sugared liquid mass contained in the apparatus. This device is known per se. The heating set is supplied with water vapour through a tube 5 which has a valve 5a and is connected to an external source of steam not shown. The water of condensation escapes through an evacuation tube 6. The cooking apparatus has a cover 7 in its upper part, which can be a standard desurgarizing cover by which it is possible to collect the drops of liquid which are entrained and to return them to the cooking apparatus. A conduit 8 connects the interior of the cover and of the apparatus A to a suitable vacuum-forming device of any type.

From the lower part of the apparatus for cooking extends a conduit 9, provided with a tap 9a by which the said apparatus can be evacuated. On the conduit 1 which connects the cooking apparatus A to the tank B a pump P is arranged to pump the sugared mass in the lower part of the cooking apparatus and to pass it at a regulable rate into the tank B.

The horizontal cylindrical tank B, which is arranged above the cooking apparatus is the embodiment illustrated, has a stirring device comprising a screw 10 driven to rotate about its shaft 10a by means of a pinion drive device 11. In the embodiment illustrated, the screw 10 is arranged so as to drive the material from the right towards the left, looking at FIG. 1. The conduit 1 opens out at 12 at the upper right-hand part of the tank and the return conduit 2 leaves at 13 the lower left-hand part of the tank in such a way that the sugared mass moves from the right towards the left of the said tank and is well stirred during its passage.

At the centre of the upper part of the tank a cover 14 is arranged from which extends a conduit 15 connecting the interior of the tank either to the free air if working at atmospheric pressure, or to a vacuum-forming device, or to a compressor, in accordance with the pressure desired in the tank.

The return conduit 2 which opens out near the bottom of the cooking apparatus has a tap 2a which makes it possible to regulate the return rate of the sugared mass coming from the tank towards the apparatus A. This tap can be controlled manually or automatically from an electric control station, or other type of control, not shown.

A conduit 16 for the supply of the sugared liquid which is freshly to be evaporated opens out in a conduit 17 connecting the upper right-hand part (looking at FIG. 1) of the tank to the conduit 2. Valves 17a and 17b are arranged on the conduit 17 on either side of the opening of the conduit 16, thus making it possible to supply the sugared liquid at will towards the tank B where it is mixed with the sugared mass contained there, or directly into the conduit 2 to be introduced into the cooking apparatus A.

A small conduit 18, located as a branch on the conduit 2 and carrying a tap 18a makes it possible for samples to be taken of the products circulating in this conduit.

The functioning of the installation illustrated in FIG. 1 is as follows:

Sugared juice to be evaporated is introduced into the cooking apparatus through the conduit 16 and the conduit 2, the valve 17a being closed, until the level N exceeds the upper part of the heating set F.

Steam is admitted into the heating set F and a vacuum is formed within the apparatus to bring about the evaporation. The sugared juice continues to be supplied, and the level rises in the apparatus. When this level exceeds a fixed height—said height being fixed in advance—and which is preferably slightly above the upper part of the heating set F (a few centimeters for instance), an amount of the sugared mass is withdrawn by means of the pump P sufficient to bring back the level to the determined height. The portion of the mass withdrawn is stored in the tank B where it can be stirred and contingently concentrated, if a vacuum is formed in the apparatus.

To keep the mass at the desired temperature in the tank B the screw 10 is advantageously of hollow construction, to permit the circulation there of a heating or cooling fluid.

To obtain good homogeneity, of the cooked mass in the apparatus A there is the arrangement in accordance with the invention of returning there at least a part of the cooked mass contained in the tank B, at the same time as the fresh sugared juice is introduced at 16. The relative rates of withdrawal of the mass by the pump P and of return through the conduit 2 are regulated in such a way that, taking into account the rate of introduction of the fresh sugared liquid through the conduit 16 and of the amount of water evaporated in the apparatus A, the level N of the mass which has been cooked remains approximately constant during the entire cooking process. The sugared mass can be withdrawn and returned continuously or intermittently. To improve the homogeneity of the cooked mass in the apparatus A, it is advantageous to supply the whole or a part of the sugared juice freshly coming from 16 to the tank B, by closing the valve 17b and by opening the valve 17a, the said sugared juice thus being mixed with the mass stored in the tank B before being supplied to the apparatus A through the conduit 2.

FIG. 2 illustrates diagrammatically an installation in accordance with the invention in which the cooking device has three cooking apparatuses A1, A2, A3 (of the type illustrated in FIG. 1) each connected to a storage tank B1, B2, B3 respectively (of the type illustrated in FIG. 1). The sugared juice to be evaporated is introduced into each cooking apparatus through the conduits 21, 22, 23 respectively.

The tank B1 is connected to the apparatus A1 by an inlet conduit for the sugared mass 24 on which a pump P1 is arranged. The level of the liquid in the apparatus A1 is determined by the position of an excess liquid device 25 from which the conduit 24 extends to the pump P1. A return conduit 26 comprising a tap 26a connects the tank B1 to the apparatus A1. The conduits 24 and 26 play the same role as the conduits 1 and 2 of FIG. 1. A third conduit 27 provided with a valve 27a connects the tank B1 to the base of the cooking apparatus A2 and returns to the latter a part of the sugared mass contained in the tank B1. In this latter the material is driven from the right to the left, looking at FIG. 2.

The tank B2 is connected to the apparatus A2 by an inlet device for the sugared mass comprising a conduit 28, an excess liquid pipe 29 and a pump P2. A return conduit 30, provided with a tap 30a connects the tank B2 to the cooking apparatus A2. Another return conduit 31 provided with a tap 31a connects the tank B2 to the base of the cooking apparatus A3. In the tank B2 the material is driven from the left towards the right looking at FIG. 2.

The tank B3 is connected to the apparatus A3 by an introduction device of the same type as that of the apparatuses A1 and A2. It comprises a conduit 32, an excess liquid pipe 33 and a pump P3. A return conduit 34 provided with a tap 34a connects the tank B3 to the base of the cooking apparatus A3. In the tank B3 the material is driven from the right to the left, looking at the figure.

The general functioning of the installation of FIG. 2 is approximately the same as that of the installation of FIG. 1, with the difference that the tanks B1 and B2 ensure in addition respectively the return of a part of the sugared stored mass towards the following cooking apparatus A2 and A3 of the series. This arrangement gives greater flexibility in functioning to the installation as a whole, and permits a continuous working of the said installation.

Finally, FIG. 3 illustrates another embodiment of the installation of the invention in which the storage tank is incorporated in the cooking apparatus.

In this installation, the cooking apparatus A4 and the tank B4 are enclosed in a common casing E. The cooking apparatus has an inner chamber arranged in the lower part of the casing E and in which is disposed a heating set F identical to that described in connection with FIG. 1. The chamber of the apparatus A4 is separated from the tank B4, which occupies the upper part of the casing E, by means of a partition in the form of cover C. This latter has a jacket 40 for the circulation of a heating fluid, such as steam, for instance, entering through a conduit 41 and leaving through a conduit 42. Another conduit 43, provided with a valve 43a, extends above the bottom of the tank B4 and it is provided with fittings 44 making it possible to supply air or steam through the sugared mass contained in the tank. A certain number of chimneys 45 pass through the cover C and extend up to above the level of the liquid in the tank B4 in order to permit the evacuation of the steam leaving the cooking apparatus A4 towards a cap or cover 46 and a conduit 47 connecting the tank B4 and the cooking apparatus A4 to a suitable vacuum-forming source.

The inlet device for the sugared mass from the cooking apparatus towards the tank (which replaces the pump P and the conduit 1 of FIG. 1), comprises an outlet conduit 48 connected to the lower part of the cooking apparatus, a cylindrical transporter 49 with screw 50 driven by a motor 51, and a conduit 52 connecting the upper part of the transporter to the upper part of the tank B4. A deflector 53 is placed in the interior of the tank opposite the outlet of the conduit 52. An agitator G, driven by a motor M, makes it possible to stir the mass in the tank B4.

The transporter 49 is surrounded by a jacket 54 into which a cooling or heating fluid can be introduced through a conduit 55 and can be evacuated through a conduit 56, in order to keep the sugared mass at the desired temperature during its passage in the transporter.

The device for returning the cooked mass into the cooking apparatus A4 (replacing the conduit 2 and the valve 2a of the installation of FIG. 1), comprises a return conduit 57 provided with a valve 57a, which opens out at the base of the apparatus A4. Over a part of its length, the conduit 57 is surrounded by a jacket 58 in which a heating fluid, or contingently a cooling fluid, can be introduced through a conduit 59 and can be evacuated through a conduit 60, in order to keep the sugared mass passing through the tube at the desired temperature for its reintroduction into the apparatus A4. An agitator 61, driven by a motor 62, is arranged in the conduit 57 to increase if necessary the rate of circulation of the mass.

The fresh sugared juice is introduced into the conduit 57 by means of a conduit 63 provided with a valve 63a.

The functioning of the installation of FIG. 3 is identical to that of the installation of FIG. 1.

The apparatus for the cooking could be of horizontal instead of vertical type, and the storage tank could be arranged at the same level as or below the cooking apparatus, it being sufficient in this case to modify the construction of the device of conduits for entry and return, in a way which will be obvious to experts. The chimneys 45 can if desired be covered with caps which will force the fumes rising in the cooker A4 to bubble through the cooked mass contained in the tank A4. A sleeve perforated over its length could then be arranged around the cap to improve the local circulation of the cooked mass. In this case, to prevent the cooked mass from being subjected to the effect of the counter pressure engendered by the bubbling of the fumes through the cooked mass of the tank, there could be provided a blower which draws off the fumes of the cooker A4 and discharges them into the bubblers located in the tank B4.

Finally, the installation of the invention also affords the possibility of proceeding to the final concentration of the cooked mass (squeezing) in two stages, or periods.

In a first period, the pressing of the cooked mass in the cooking apparatus is carried out, this is emptied and then the cooking apparatus is refilled with the cooked mass stored in the storage tank and its pressing or squeezing takes place. If the storage tank has a suitable heating surface it is also possible to undertake the pressing of the cooked mass in the tank.

I claim:

1. A method for improving the crystallization of sugar by evaporation of the sugared liquids in the cooking devices of sugar factories and refineries comprising withdrawing from the cooking device a portion of the sugared mass which it contains, keeping the said portion in reserve and sending back at least a part of the said portion to the cooking device which also receives fresh sugared liquid to be evaporated, the rates of withdrawal and of return of the said portion being regulated in such a way as to keep a substantially constant level of liquid in the cooking device.

2. A method in accordance with claim 1, in which the said portion is stirred while it is kept in reserve.

3. A method in accordance with claim 1, in which at least a part of the fresh sugared liquid to be evaporated is mixed with the said portion kept in reserve before passing them to the cooking device.

4. An installation for the crystallization of sugar by evaporation of sugared liquids in sugar factories and refineries comprising a cooking apparatus having an inner chamber, means for feeding fresh sugared liquid to the apparatus, a heating set disposed in the lower part of said chamber for heating the sugared liquid in said chamber, and means for maintaining the sugared liquid fed to said chamber at a given desired level relative to said heating set, said liquid level maintaining means comprising first conduit means communicating with said chamber and affording an outlet for any excess sugared liquid to be drawn off from said chamber, a storage tank having a first part communicating with said chamber by way of said first conduit means for storing the excess sugared liquid drawn off, second conduit means putting a second part of said tank remote from said first part thereof in communication with said chamber for recycling the sugared liquid from said tank, and means for regulating the rate of flow of the sugared liquid through said feed means, said conduit means and said tank.

5. An installation in accordance with claim 4, in which the tank is connected to a device for modifying the pressure above the sugared liquid.

6. An installation in accordance with claim 4, in which the tank has a heating device.

7. An installation in accordance with claim 4, in which the tank and the cooking apparatus are arranged one above the other in a common housing.

8. An installation in accordance with claim 4, comprising a plurality of cooking apparatuses each connected to a storage tank, the storage tanks of some of the apparatuses being connected in addition by conduits to another cooking apparatus of the installation.

9. An installation in accordance with claim 4, further comprising a stirring device in said tank.

10. An installation in accordance with claim 4, in which the tank is separate from the cooking apparatus.

11. An installation in accordance with claim 10, in which the means for regulating the rate of flow of the sugared liquid comprise a pump arranged in said first conduit means and a valve arranged in said second conduit means.

References Cited

UNITED STATES PATENTS

| | | | |
|---|---|---|---|
| 1,066,397 | 7/1913 | Fromm et al. | 127—16 |
| 1,420,648 | 6/1922 | Mabee | 159—25 |
| 1,880,925 | 10/1932 | Eissner | 159—45 |
| 2,025,059 | 12/1935 | Kermer | 159—45 |
| 2,330,221 | 9/1943 | Kermer | 159—45 |

OTHER REFERENCES

Troin et al.: "Effect of the Level of Fluid and Rate of Circulation on Heat Exchange . . ." Sug. Ind. Abs. (1963), p. 171.

MORRIS O. WOLK, Primary Examiner

D. G. CONLIN, Assistant Examiner

U.S. Cl. X.R.

23—273; 127—58, 62; 159—45